April 19, 1960 R. P. JOHNSON 2,932,969
WATER DEPTH MEASURING DEVICE
Filed May 4, 1956 2 Sheets-Sheet 1
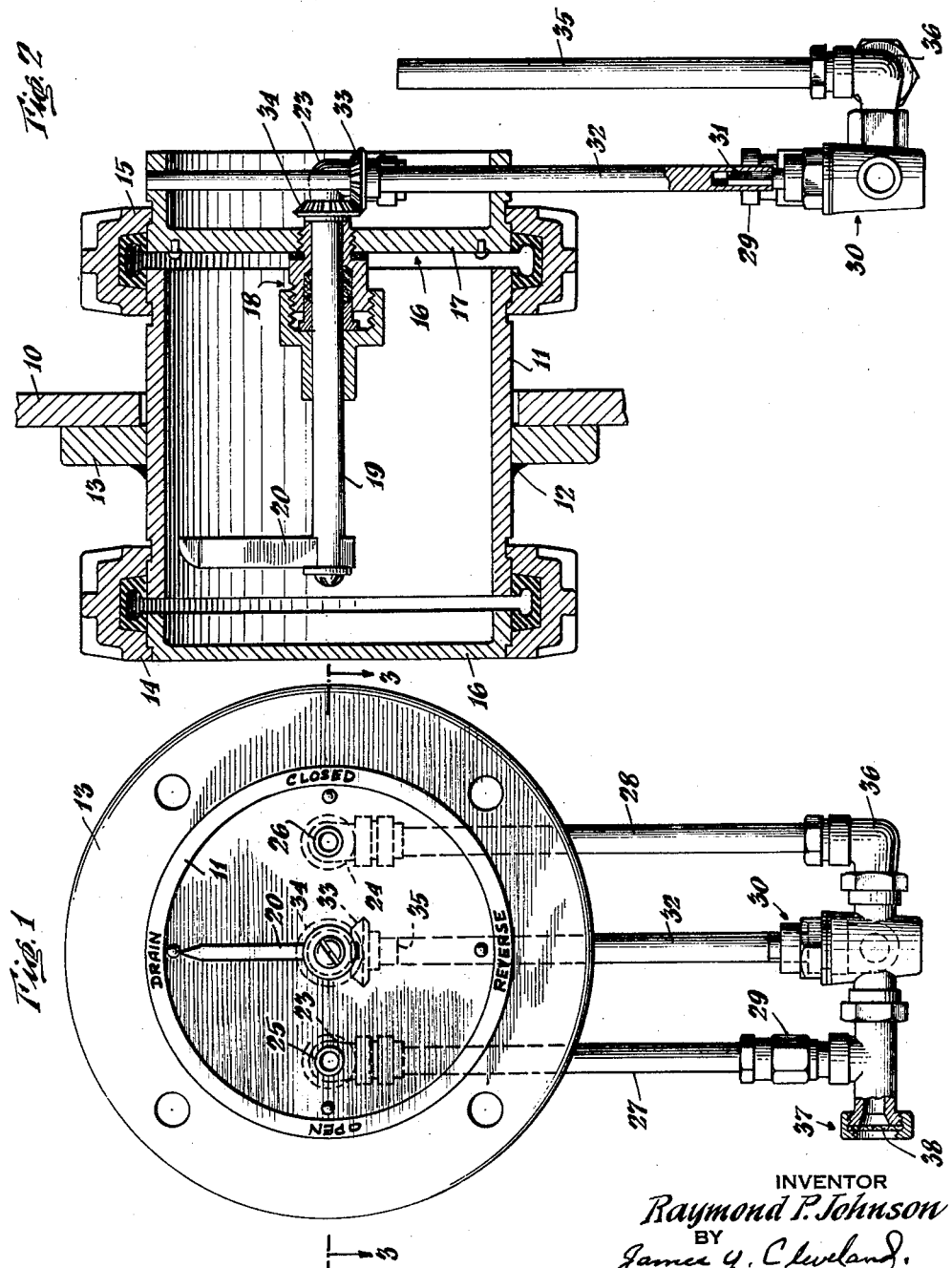
INVENTOR
Raymond P. Johnson
BY
James Y. Cleveland
ATTORNEY April 19, 1960 R. P. JOHNSON 2,932,969
WATER DEPTH MEASURING DEVICE
Filed May 4, 1956 2 Sheets-Sheet 2
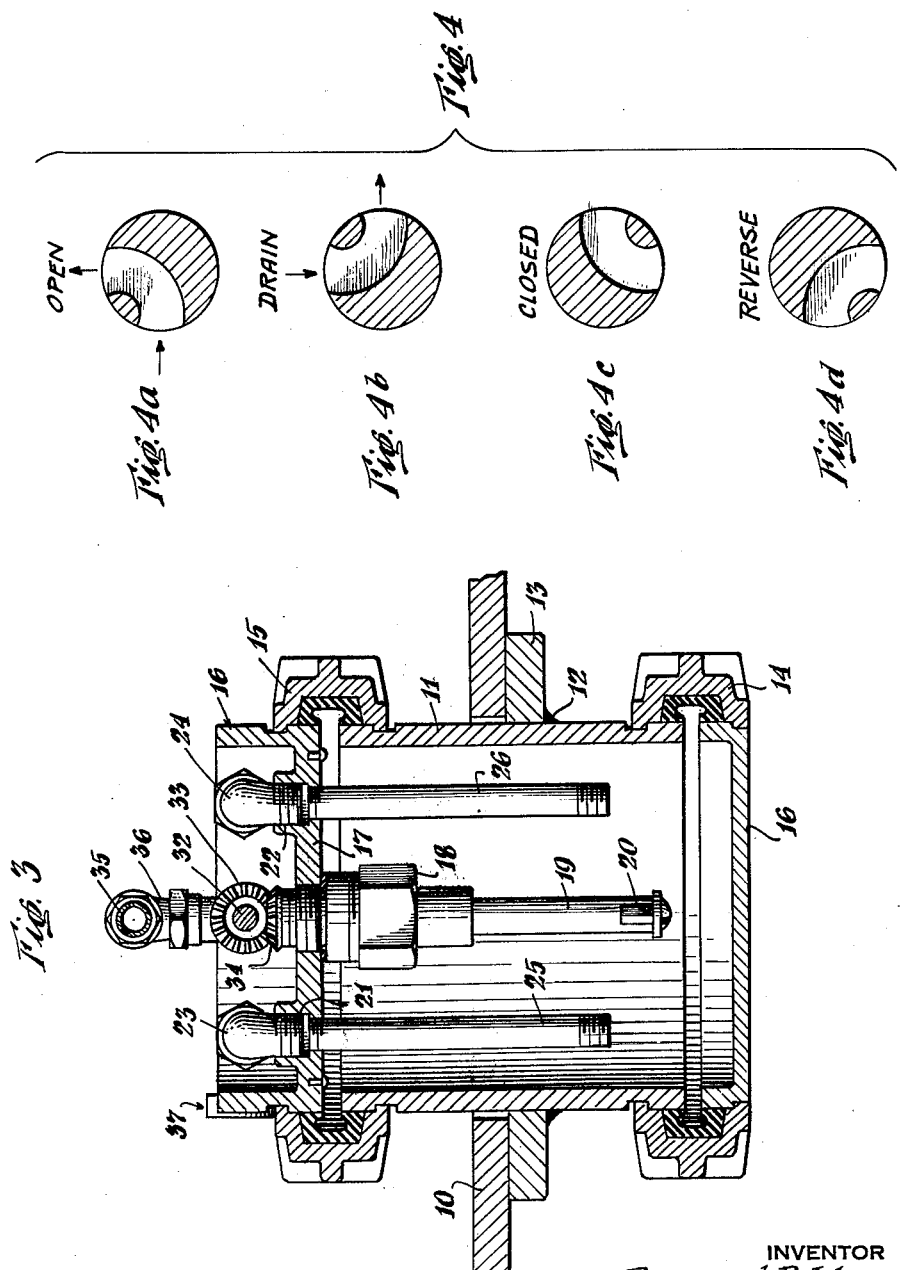
INVENTOR
Raymond P. Johnson
BY
James Y. Cleveland
ATTORNEY

United States Patent Office 2,932,969
Patented Apr. 19, 1960

2,932,969

WATER DEPTH MEASURING DEVICE

Raymond P. Johnson, New Baltimore, N.Y., assignor to Socony Mobil Oil Company, Inc., a corporation of New York Application May 4, 1956, Serial No. 582,722

2 Claims. (Cl. 73—290)

This invention relates to a depth measuring device and, more particularly, to a device for measuring the depth of water in bulk, oil or gasoline storage tanks.

In the operation of bulk tankage for the storage of petroleum products, some tanks, such as those used for the storing of gasoline, contain what is known in the art as a water bottom. The depths of this water in the bottom of the tank varies from three to six inches and is usually approximately one inch over the highest elevation in the bottom plates of the tank. The purpose of this water bottom is to enable the tank gager to detect a leak in the bottom of the tank by a decrease in the water depth between measurements taken at selected intervals of time. Also, an addition to the depth, above a predetermined depth, must be known and withdrawn so that it does not reach a level that would permit it to enter the product discharging line. This additional water may come from the transportation media, such as a barge or ocean tanker, or from rain or melting snow which sometimes is allowed to drain off the roof of a floating roof tank directly into the tank. Therefore, the taking of water measurements at selected time intervals is a necessity.

Prior to this invention, no means have been known for measuring the depth of the water bottom without the necessity for an operator to ascend steps or a ladder to the top of the tank and there make his measurements. Devices which have heretofore been used for making such measurements from the top of the tank have been a long pole or rod coated with a water detecting paste which would change color when coming into contact with the water, or a short metal bob attached to a calibrated steel tape which could be lowered from the roof of the tank until it just contacted the tank bottom. The tape would be coated with the water detecting paste which would change color when contacting the water. In both of the preceding methods a measurement is made of that amount of the pole or tape on which the paste has changed color.

An increasing use of automatic devices to measure parameters such as depth and temperature of bulk tank contents at the ground level at a central location within the storage terminal makes it necessary to employ some other means to measure the water depth which will not make it necessary for the operator to climb to the top of the tank. If the gager or operator must go to the roof of the tank to make the water depth measurement, then there would be very little advantage derived from the installation of modern, automatic equipment for measuring other parameters. The present invention enables the operator to make the water depth measurement at ground level and thereby effect an enormous saving of time and at the same time eliminate safety hazards that are associated with climbing tank stairways or ladders.

Therefore, the primary object of this invention is to provide a water depth measuring device that can be installed in the wall or shell of a tank at ground level in such a manner that it can be operated by a gager at that level to accurately determine the number of inches of water in the bottom of the storage tank.

Other objects and advantages of the present invention will become apparent from the following detailed description when taken with the drawings in which:

Figure 1 is a front elevational view of the device as it would appear removed from the tank;

Figure 2 is a side view of the device partly in vertical section and shown mounted in operative position on a tank wall;

Figure 3 is a plan view of the device as shown in Figure 1; and

Figure 4 shows four positions that may be occupied by the control valve forming a part of the instant invention.

Referring to the drawings in detail, particularly Figures 1, 2 and 3, there is shown mounted in an opening in a storage tank wall or shell 10 a cylindrical sleeve element 11. Sleeve 11 may be secured to the wall, as by welding, as shown at 12. In order to more firmly secure element 11 in operative position and to strengthen that portion of the tank wall adjacent the opening in which sleeve 11 is mounted, there is provided a reinforcing plate 13 which may be secured to both the wall and the sleeve element 11 by means of welds. Sleeve 11 is provided at opposite ends with conventional quick-detachable couplings 14 and 15. Coupling 14 is adapted to secure in closing position cap 16 when the device is not being operated to make a water depth measurement. Coupling 15 secures an assemblage 16 of elements to the opposite or inner end of sleeve 11. An element of the assembly 16 is a closure member 17 provided with a combination bearing and stuffing box 18 through which an operating shaft 19 extends to a point inside of the tank. The outer end of shaft 19 is provided with an operating handle 20 which also serves as an indicator to indicate the condition of a four-way valve, to be described in detail later. Closure element 17 is also provided with openings 21 and 22 that are adapted to receive from the inside of the tank elbow type couplings 23 and 24 which communicate respectively with conduits or pipes 25 and 26 which terminate within sleeve 11. The bottom ends of the elbow type fittings 23 and 24 connect to pipes 27 and 28 respectively, which are connected at their bottom ends to the four-way valve manifold assembly. There is interposed between the bottom end of pipe 27 and the four-way valve manifold assembly a check valve 29. The four-way valve 30 is provided with an operating stem 31 that is connected through a rotatable shaft 32 to a bevel gear 33. Bevel gear 33 meshes with bevel gear 34, whose axis of rotation is at right angles to that of gear 33. Gear 34 is secured to the inner end of operating shaft 19 so that rotation of handle 29 will produce rotation of the four-way valve 30. Valve 30 is of the four-way, two-port type of plug valve and forms a part of a manifold made up of pipe fittings so arranged that operation of the valve 30 will selectively connect passageways which include passageways to pipes 27, 28 and 35 and another defined by the coupling 37 which carries a strainer 38 and communicates with the interior of the storage tank.

As shown in Figures 1 and 4, handle 20 can be operated to four positions, each of which represents a condition of the valve 30. These conditions are "open," "drain," "closed" and "reverse." In the open position, as represented by Figure 4a, communication is established between the interior of the tank and a measuring tube 35. The bottom end of measuring tube 35 is secured to the valve assembly manifold by means of a suitable pipe fitting 36. The top end of the measuring tube 35 is open.

In operation, when it is desired to make a measurement of the water bottom in a tank, the handle 20 is moved to the indicated open position. This movement of handle 20 effects a rotation of shafts 19 and 32 and valve stem 31 to rotate the valve 30 to the condition shown in Figure 4a. When the valve is in this position, liquid is allowed to enter the manifold through strainer 38 and through the valve 30 into the measuring tube 35. After a short interval of time has elapsed, sufficient for the water entering tube 35 to statically balance the overburden of product in the tank, handle 20 is then moved to the indicated drain position. The condition of the valve 30 is then as shown in Figure 4b. In this position, measuring tube 35 is connected through pipe 28 to pipe 26. When the valve is in this position, the static head of the liquid within the tank will force the water from the measuring tube 35 out through pipe 26 into a measuring container. The valve is allowed to remain in this position until all of the water is drained from measuring tube 35 and other products start to flow from the pipe 26. The operating handle 20 is then moved to the indicated closed position to shut off the flow of liquid from the tank. This condition of the valve is illustrated at Figure 4c. The amount of water drawn off through the pipe 26 is measured as an index to the depth of water in the bottom of the storage tank. Should the strainer 38 become clogged, a pump can be attached to the threaded end of pipe 25 and liquid or air pumped into it and through pipe 27, valve 30 and out through the strainer 38 into the storage tank. When this pumping action is to be utilized, the operating handle 20 is first turned to the indicated reverse position. The condition of the valve 30, when the operating handle is at reverse position, is as shown in Figure 4d. Communication is established between pipe 27 through check valve 29 and valve 30 with the inlet fitting 37. After the strainer has been cleared, valve 30, through the operating handle 20, is again returned to its indicated closed position.

Cap 16, which forms a closure for the outer end of element 11, remains coupled thereto at all times except when gaging operations are taking place. Although a snaplock type of coupling is shown at 14, it is obvious to those skilled in the art that a bayonet type cap could be used to secure the cap 16 to the outer end of element 11.

I claim:

1. A device for measuring water bottoms inside a tank otherwise containing a bulk supply of water-immiscible, lighter-than-water fluid, comprising an imperforate vertical first pipe, open at its upper end, extending into said bulk supply to a point above any expected water level, a manifold adjacent the bottom of said tank to which said first pipe is attached, a second pipe extending from said manifold to a point adjacent the bottom of said tank and open to tank contents at its outboard end, a third pipe extending from said manifold to a point external of said tank, and in said manifold valve means arranged to first selectively connect said first pipe with said second pipe while isolating it from said third pipe so that water bottoms may pass through said second pipe into said first pipe and reach a level therein corresponding to the level of water bottoms in said tank, and to secondly connect said first pipe to said third pipe while isolating it from said second pipe, whereby the water trapped in said first pipe may be forced to a point without the tank by the hydrostatic pressure of the stored fluid acting through the open upper end of the first pipe.

2. A device for measuring water bottoms inside a tank otherwise containing a bulk supply of water-immiscible, lighter-than-water fluid, comprising an imperforate vertical first pipe, open at its upper end, extending into said bulk supply to a point above any expected water level, a manifold adjacent the bottom of said tank to which said first pipe is attached, a second pipe extending from said manifold to a point adjacent the bottom of said tank and open to tank contents at its outboard end, a third pipe extending from said manifold to a point external of said tank, in said manifold valve means arranged to first selectively connect said first pipe with said second pipe while isolating it from said third pipe so that water bottoms may pass through said second pipe into said first pipe and reach a level therein corresponding to the level of water bottoms in said tank, and to secondly connect said first pipe to said third pipe while isolating it from said second pipe, whereby the water trapped in said first pipe may be forced to a point without the tank by the hydrostatic pressure of the stored fluid acting through the open upper end of the first pipe, a fourth pipe, communicating between said manifold and a point outside of said tank, and in said fourth pipe a check valve preventing outward flow of tank fluid, whereby the said manifold and internal pipes connected thereto may be cleaned by the application of fluid pressure from a supply external to said tank.

References Cited in the file of this patent

UNITED STATES PATENTS

| | | |
|---|---|---|
| 322,837 | Macfarlane | July 21, 1885 |
| 1,739,731 | Osborne | Dec. 17, 1929 |
| 1,979,705 | Raymond | Nov. 6, 1934 |